United States Patent [19]

Ogawa

[11] 3,977,498
[45] Aug. 31, 1976

[54] DISC BRAKE CALIPER MOUNTING
[75] Inventor: Yutaka Ogawa, Tokyo, Japan
[73] Assignee: Akebono Brake Industry Co., Ltd., Japan
[22] Filed: Apr. 7, 1975
[21] Appl. No.: 565,594

Related U.S. Application Data
[63] Continuation of Ser. No. 360,646, May 16, 1973, abandoned.

[30] Foreign Application Priority Data
May 17, 1972 Japan.................................. 47-48960

[52] U.S. Cl............................. 188/73.3; 188/73.5; 188/250 B
[51] Int. Cl.² ........................................ F16D 55/224
[58] Field of Search................. 188/73.3, 72.4, 72.5, 188/73.5, 250 B, 370

[56] References Cited
UNITED STATES PATENTS
| 3,388,774 | 6/1968 | Burnett............................. 188/73.5 |
| 3,416,634 | 12/1968 | Swift.................................. 188/73.3 |
| 3,881,576 | 5/1975 | Haraikawa et al.................. 188/73.3 |

FOREIGN PATENTS OR APPLICATIONS
| 1,230,553 | 9/1960 | France............................... 188/72.5 |
| 1,378,479 | 12/1974 | United Kingdom................. 188/73.3 |

Primary Examiner—George E. A. Halvosa
Assistant Examiner—Edward R. Kazenske
Attorney, Agent, or Firm—McGlew and Tuttle

[57] ABSTRACT

A single-cylinder, suspended caliper type disc brake includes a caliper assembly comprising an acting member disposed on one side of a disc and a reacting member on the opposite side thereof. A slot or an aperture is provided in the head portion of the caliper which straddles the periphery of the disc. The slot extends horizontally and parallel to a tangent of the disc, being located radially outwardly of the tangent. A fixed arm or bracket extends horizontally in the rotational direction of the disc and is inserted into the slot or aperture and supports the caliper assembly for guided movement in the axial direction of the disc.

6 Claims, 6 Drawing Figures

DISC BRAKE CALIPER MOUNTING

This is a streamlined continuation of application Ser. No. 360,646 filed May 16, 1973 now abandoned.

FIELD, BACKGROUND AND SUMMARY OF THE INVENTION

In the conventional disc brakes, a caliper having friction pads is usually guided on a fixed support. In accordance with the present invention, an arm or bracket fixed to a rigid part of a vehicle structure is inserted in an aperture provided in the head portion of a caliper to support and guide the caliper so that the disc brake can be made more compact than the conventional ones.

This invention relates to a disc brake for vehicles, and more particularly to a compact disc brake which is applicable to small vehicles such as autobicycles.

It is an object of this invention to provide a disc brake suitable for small vehicles. In accordance with this invention, the conventional 2-cylinder, 2-piston opposed type disc brake is replaced with a floating caliper type. Furthermore, the caliper, which has hitherto been guided through a fixed support, is changed into a guided, suspended caliper type by providing a slot or an aperture in the head portion of the caliper, which straddles the periphery of a disc, and by inserting in the slot or aperture a fixed arm or bracket which extends horizontally in the rotational direction of the disc.

Another object of this invention is to provide a disc brake wherein guide pins provided on the head portion of the caliper are inserted in holes provided in the fixed arm or bracket so that the caliper can be slidably mounted and guided by the fixed arm or bracket.

A further object of this invention is to provide a disc brake wherein the play of the caliper is eliminated and a smooth braking operation is ensured by the use of a wave-shaped spring or antirattle spring inserted in between the caliper and the fixed arm or bracket.

A still further object of this invention is to provide a disc wherein the sliding part is effectively sealed either by the use of a boot arranged between the fixed arm or bracket and the end of the caliper or by placing the guide pins in blind holes provided in the caliper.

BRIEF DESCRIPTION OF THE DRAWINGS

Other objects, features and advantages of the invention will be apparent from the following detailed disclosure, taken in conjunction with the accompanying sheets of drawings, wherein like reference numerals refer to like parts, in which.

DESCRIPTION OF THE PREFERRED EMBODIMENTS

Figure 1:
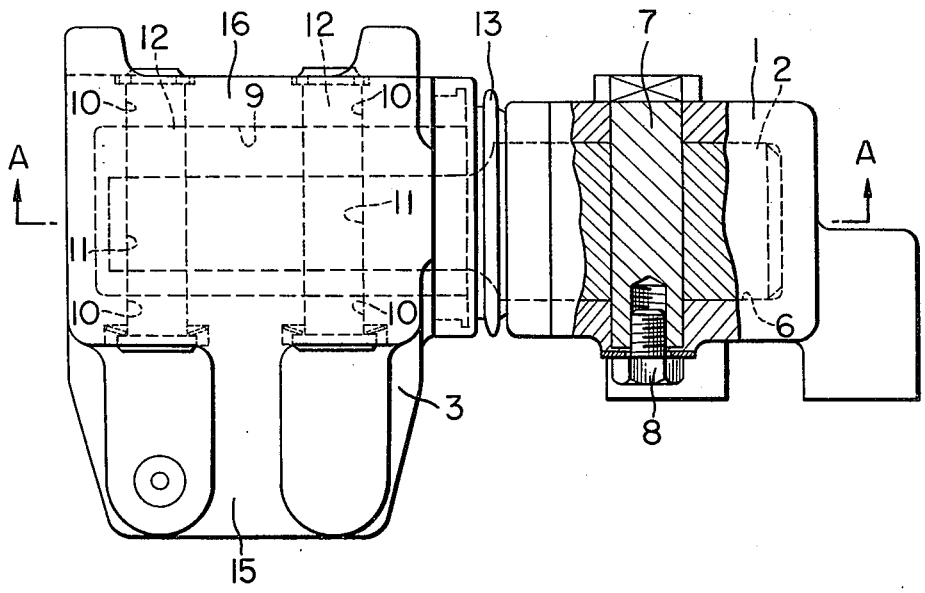
FIG. 1 is a plan view, partly in section, of one form of disc brake embodying the invention.
Figure 2:
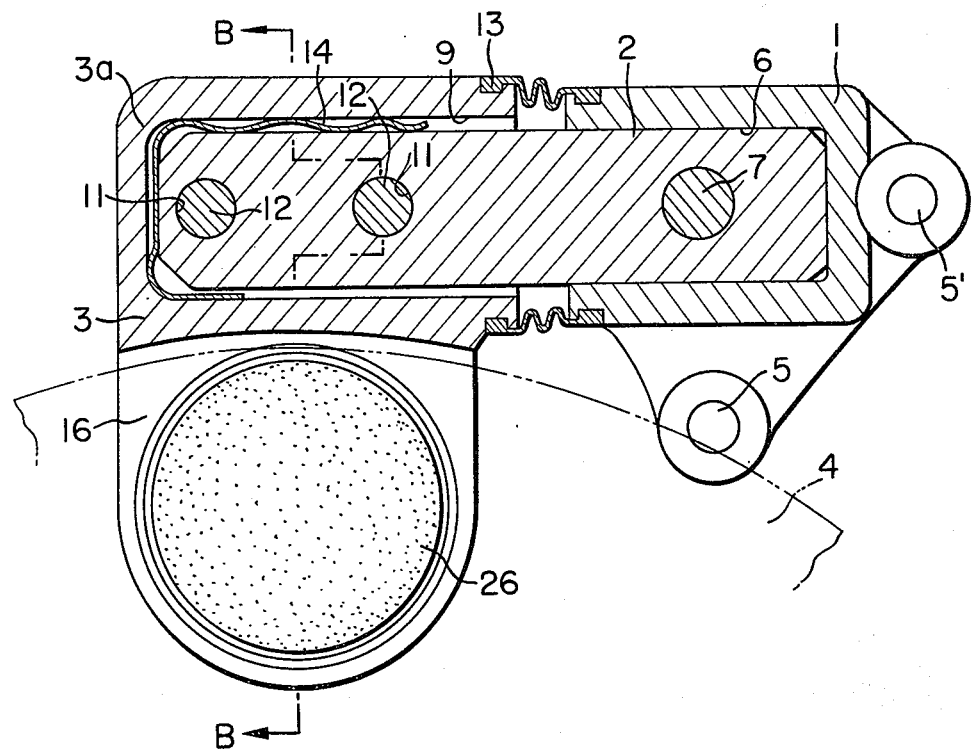
FIG. 2 is a sectional view taken on the line A—A of FIG. 1.
Figure 3:
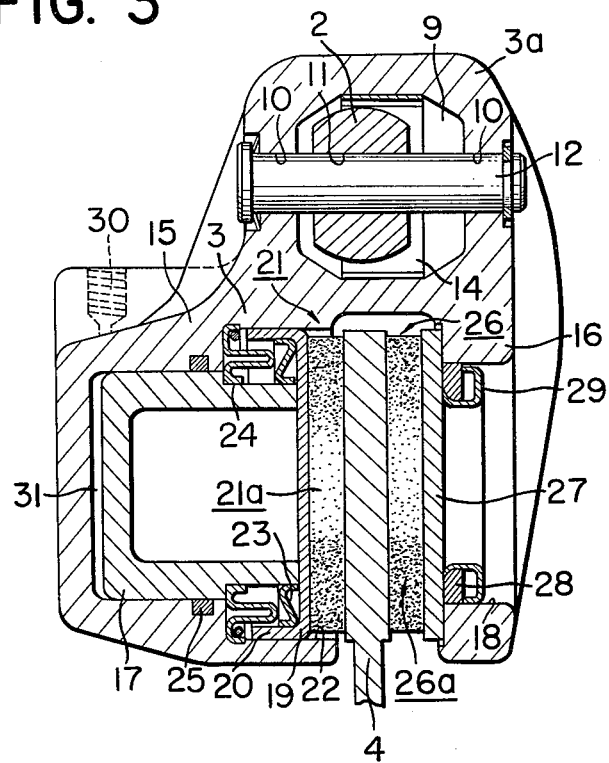
FIG. 3 is a sectional view taken on the line B—B of FIG. 2.

In the first embodiment, illustrated in FIG. 1, 2 and 3, an arm is fixed in a cylindrical part of a rigid support, a caliper having an acting member on one side of a disc and a reacting member on the opposite side is provided with a slot, extending paralled to a tangent to the disk, in its head portion, and the fixed arm is inserted horizontally in the slot.

Furthermore, in this embodiment, an annular flange is provided on the back plate of a circular inner friction pad assembly which is positioned between the disc and the cylinder part of the caliper. A ring spring is placed between this annular flange and the outer side of a piston. An annular protrusion is provided on the back plate of an outer friction pad which is positioned between the disc and the reacting member of the caliper. This annular protrusion engages within an annular aperture provided in the reacting member of the caliper, while a ring spring is provided between the annular protrusion and the reacting member of the caliper. This arrangement prevents the rattling of the inner and outer friction pads and thus enables the caliper to receive the brake torque.

Referring to FIG. 1, the reference numeral 1 indicates a rigid support; 2 an arm fixed to the rigid support 1; 3 a caliper; 6 a cylindrical recess in the rigid support 1; 7 a support pin fixing the arm 2 to the rigid support 1; and 8 a bolt. A slot 9 is provided in the head portion 3a of the caliper 3 and extends horizontally parallel to a tangent to the disc 4. The arm 2 is placed in the slot 9. Holes 10 and 11 are provided in the head portion 3a of the caliper and the arm 2 respectively. Guide pins 12 extends through these holes. The adjacent ends of the rigid support 1 and the caliper head 3a are covered by a boot 13. The reference numeral 15 indicates the cylinder part of the caliper 3 and 16 the reacting member of the caliper.

Referring to FIG. 2, reference numeral 14 indicates a wave-shaped spring provided between the slot 9 of the caliper head 3a and the arm 2, 16 is the reacting member of the caliper, and 26 is an outer friction pad provided between the reacting member 16 and the disc 4. The arm 2 stretches over the periphery of the disc 4 to hold and guide the caliper 3, one end of the arm being fixed in the cylindrical recess 6 of the rigid support 1. However, the arm 2 and the rigid support 1 may be formed integral with each other.

Referring to FIG. 3, a piston 17 is fitted in cylinder 15 while an annular aperture 18 is provided in the reacting member 16. An inner friction pad 21 is provided between the piston 17 and the disc 4. The inner friction pad assembly comprises a back plate 19 and a pad 21a. An annular flange 20 of the back plate 19 is in contact with the guiding face 22 of the cylinder 15. A ring-shaped spring 23 is fitted in between the reverse side of the annular flange 20 and the outer side of the piston 17.

A dust seal 24 is provided between the inner face of the cylinder 15 and the outer face of the piston 17, and a piston seal 25 in between the cylinder 15 and the piston 17. An outer friction pad 26 is provided between the reacting member 16 of the caliper 3 and the disc. The friction pad assembly 26 comprises a pad 26a and a back plate 27. The back plate 27 is provided with an annular protrusion 28, which is either welded to or formed integrally with the plate. The annular protrusion 28 engages with the annular aperture 18 provided in the reacting member 16 of the caliper in such a manner that the braking torque developed at the outer friction pad 26 is transmitted to the reacting member 16. Between the annular protrusion 28 and the annular aperture 18, there is provided a ring-shaped spring 29 which prevents the rattle of the outer friction pad 26. The reference numeral 30 indicates a fluid inlet and 31 a fluid chamber of the cylinder 15.

The above described embodiment operates as follows: With a fluid pressure being received at the fluid chamber 31 through the inlet 30, the pressure causes the piston 17 to press the inner friction pad 21 against the disc 4, and a reaction to this pressure causes the reacting member 16 of the caliper to press the outer friction pad 26 against the disc 4 thus performing a braking action. At the time of the braking action, the reacting member 16 of the caliper operates as the guide pins 12 slide through the holes 11 of the arm 2 in parallel with the rotation axis of the disc, and the braking torque is transmitted to the rigid support 1 through the guide pins 12.

Figure 4:
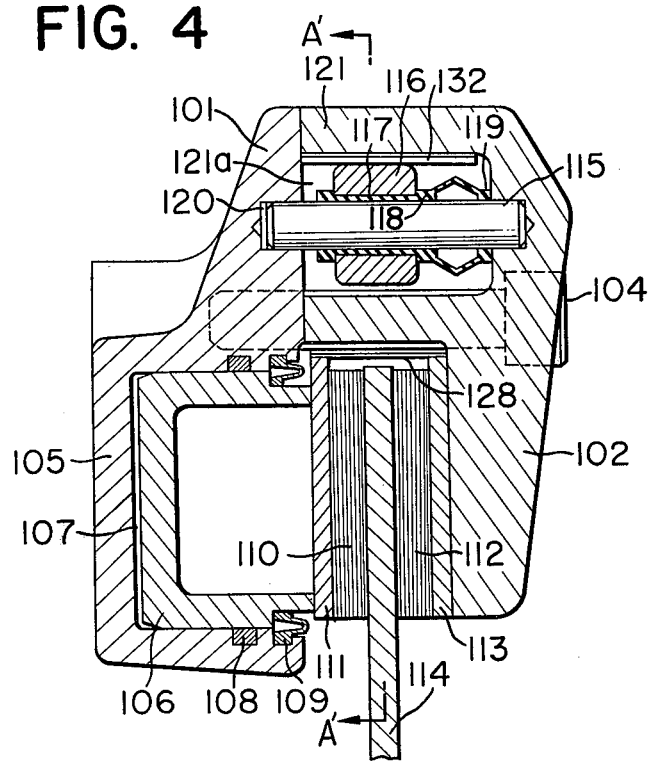
FIG. 4 is a sectional veiw illustrating another disc brake embodying the invention.
Figure 5:
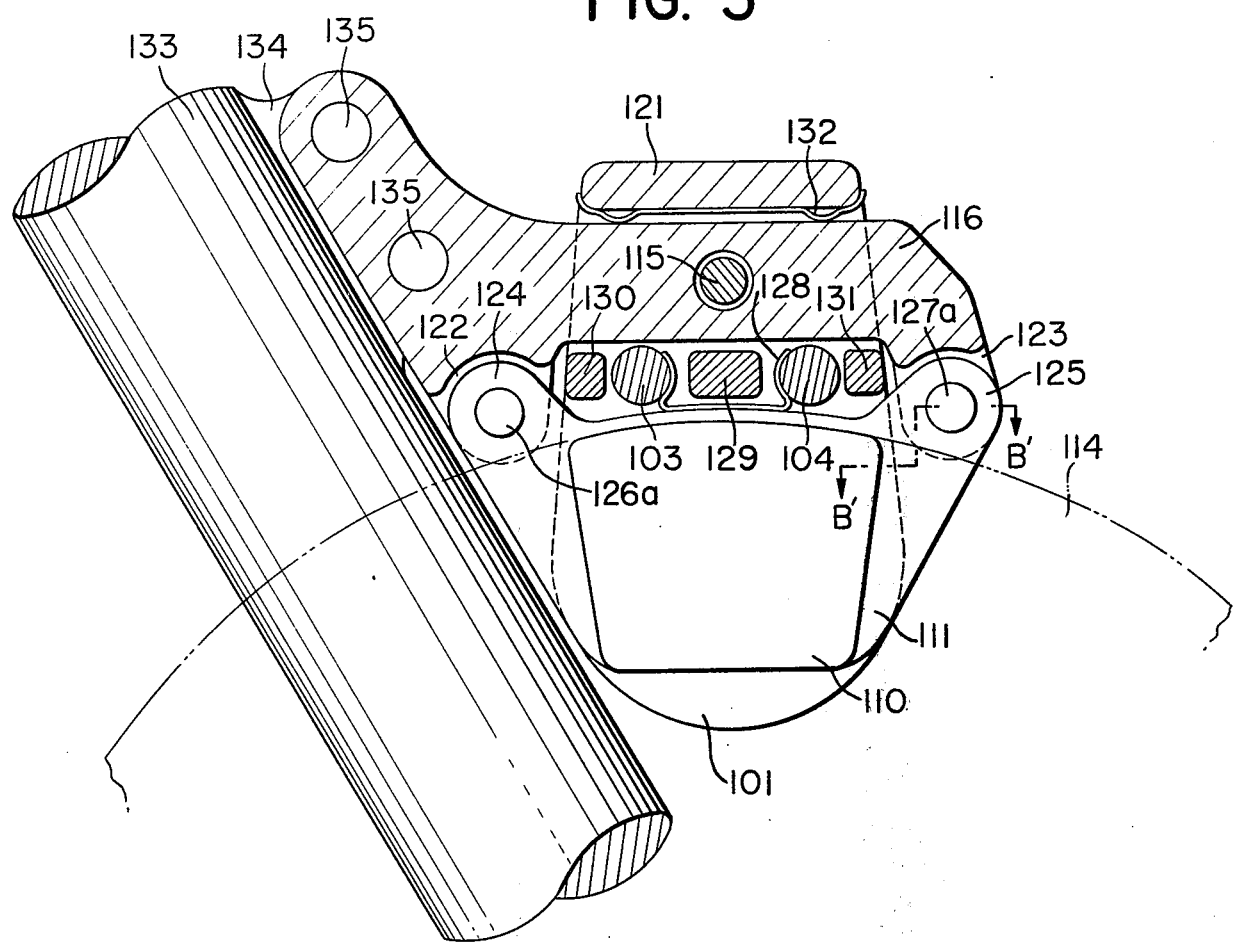
FIG. 5 is a sectional view taken on the line A'—A' FIG. 4.
Figure 6:
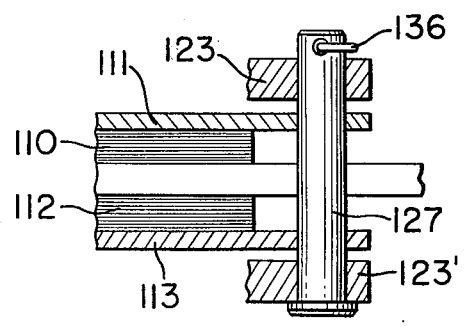
FIG. 6 is a sectional view taken on the line B'—B' of FIG. 5.

In the second embodiment, as illustrated in FIG. 4, 5 and 6, an inner caliper member 101 which has an acting element is formed separately from an outer caliper member 102 which represents a reacting element. A caliper guide pin which extends through a hole provided in the fixed bracket is inserted in blind holes provided in the caliper assembly. Inner and outer friction pads are guided by pins fixed to the flanges of the fixed bracket. The friction pad guide pins are located outside the caliper assembly so that the braking torque in this case is directly received by the fixed bracket.

Referring to FIG. 4, the inner caliper 101 and the outer caliper 102 are connected to each other by bolts 103 and 104 to form a caliper assembly. The reference numeral 105 indicates a cylinder; 106 a piston; 107 a fluid chamber of the cylinder 105; 108 a seal; 109 a boot, 110 an inner friction pad; 111 a back plate affixed to the pad 110; 112 an outer friction pad; 113 a back plate affixed to the pad 112; 114 a disc; 115 a caliper guide pin; 116 a fixed horizontally extending bracket; 117 a guide hole provided in the fixed bracket 116; 118 a rubber bush; 119 a boot which is formed together with the rubber bush in one unified piece; 120 a rubber ring; 121 the head portion of the outer caliper 102; 121a a slot, extending horizontally and parallel to a tangent to disc 114, provided in the outer caliper head 102 and receiving horizontal bracket 116; and 128 and 132 antirattle springs. In FIG. 5, 122 and 123 are the flanges of the fixed bracket 116; 124 and 125 the ear-shaped parts of the back plates of friction pads; 126a and 127a the holes which are provided in the parts 124 and 125 of the back plates and through which the respective pad guide pins 126 and 127 extend; 128 the antirattle spring which is located between the edge of the friction pad back plate 111 and the connecting bolts 103 and 104; 129, 130 and 131 the protrusions which are provided on the outer caliper 102 and which are in contact with the inner face of the inner caliper 101; and 121 the head portion of the outer caliper 102. There is provided another antirattle spring 132 between the head portion 121 of the outer caliper 102 and the fixed bracket 116. The numeral 133 indicates a fork of an autobicycle; 134 the flange of the fork; and 135 the mounting holes for fixing the fixed bracket 116 to the fork flange 134 by means of bolts.

FIG. 6 illustrates a pad guide pin 127 as extending between and through the flanges 123 and 123' of fixed bracket 116, and held in position by a head on one end and a spigot or cotter pin 136 inserted through the opposite end.

The embodiment illustrated by FIG. 4 operates as follows: When the fluid pressure of the fluid chamber 107 presses the inner friction pad 110 against the disc 114, the reaction to this action causes the caliper assembly (consisting of parts 101 and 102) to slide along the caliper guide pin 115 in the guide hole 117 of the fixed bracket 116. Then, the outer caliper member 102 presses the outer friction pad 112 against the disc 114 to effect the braking action.

As shown in FIG. 5, the antirattle spring 132 which is located between the head portion 121 of the caliper assembly and the fixed bracket serves to retain the stability of the caliper assembly (101 and 102) in the rotational direction of the disc 114. Another antirattle spring 128 which is in contact with the edge of the friction pad plate 111 serves to prevent rattling under the non-braking condition and squeaking under the braking condition.

Referring now to FIG. 6, the friction pads 110 and 112 can be guided by the pad guide pin 127 connected to the flanges 123 and 123' of the fixed bracket 116. Thus, the braking torque applied to the friction pads 110 and 112 is transmitted to the fixed bracket 116. Since these pad guide pins 126 and 127 are located outside the caliper assembly as shown in FIG. 5, the friction pads can be readily replaced by simply removing the spigot pin 136 (FIG. 6) and by pulling out guide pins 126 and 127.

What is claimed is:

1. A disc brake, for a vehicle, of the single-cylinder caliper type, comprising, in combination, a sliding caliper assembly having an acting member on one side of a disc and a reacting member on the opposite side thereof, so that said caliper assembly straddles the periphery of the disc; each of said members having a respective friction pad associated therewith, each of said friction pads being engageable with the disc; said caliper assembly having a head interconnecting said acting and reacting members and straddling the disc; said head being formed with an elongated, substantially horizontal slot extending parallel to and outwardly of a tangent to the disc with its bottom side being bridged by a bridge portion of said head, and said slot having spaced sidewalls, and a top wall defined by said head; said slot being open at at least one end to receive an elongated member fixed to the vehicle structure and extending substantially horizontally in said slot, with lateral clearance, to suspend said caliper assembly; and means interengaged between said member and said caliper assembly and guiding said caliper assembly for movement axially of said disc.

2. A disc brake as claimed in claim 1, in which said slot is closed at one end and open at its opposite end to receive said member.

3. A disc brake, as claimed in claim 2, including a U-shaped plate spring having a pair of legs extending in substantially parallel relation from a bight, said plate spring being engaged in said slot and embracing said member; the upper leg of said plate spring undulating longitudinally thereof and being disposed between the upper surface of said member and said top wall, the bight of said plate spring being engaged with said closed end of said slot, and the lower leg of said plate spring being planar and positioned between the bottom surface of said member and the bottom side of said slot.

4. A disc brake, as claimed in claim 1, in which said member comprises a fixed portion secured to a rigid part of the vehicle structure and an arm extending from said fixed portion and over the periphery of said disc; said arm being inserted in said slot; said guiding means comprising guide pins interengaged with said arm and the head of said caliper assembly and extending parallel to the axis of the disc.

5. A disc brake as defined in claim 1, said member including a bracket fixed to a rigid part of the vehicle structure; flanges on said fixed bracket; and friction pad guide pins fixed to said flanges to guide said friction pads; said guide means comprising guide pins on said fixed bracket guiding said caliper assembly.

6. A disc brake as defined in claim 5, including a pair of anti-rattle springs, one engaged between said fixed bracket and the inner surface of said slot and the other between said caliper assembly and the edges of said friction pads.

* * * * *